(12) United States Patent
Lo

(10) Patent No.: US 6,676,235 B1
(45) Date of Patent: Jan. 13, 2004

(54) MULTI-RESOLUTION PRINTING DEVICE

(75) Inventor: Hsin-Pao Lo, Taoyuan Hsien (TW)

(73) Assignee: Teco Image Systems Co., Ltd., Taipei (TW)

( * ) Notice: Subject to any disclaimer, the term of this patent is extended or adjusted under 35 U.S.C. 154(b) by 0 days.

(21) Appl. No.: 10/207,244

(22) Filed: Jul. 30, 2002

(51) Int. Cl.[7] .............................................. H04N 1/034
(52) U.S. Cl. .................................. 347/3; 347/5; 347/9
(58) Field of Search .............................. 347/3, 5, 9, 15, 347/10, 11, 19; 358/1.1–1.18; 327/8, 117, 145; 345/205

(56) References Cited

U.S. PATENT DOCUMENTS

| | | | | |
|---|---|---|---|---|
| 6,014,132 A | * | 1/2000 | Shimada et al. | ............ 345/173 |
| 6,325,478 B1 | * | 12/2001 | Imai et al. | .................... 347/15 |
| 6,339,422 B1 | * | 1/2002 | Kuwajima et al. | .......... 345/204 |
| 6,350,003 B1 | * | 2/2002 | Ishikawa | ..................... 347/11 |
| 6,445,232 B1 | * | 9/2002 | Logue et al. | ................ 327/158 |

* cited by examiner

Primary Examiner—Stephen D. Meier
Assistant Examiner—Lam Nguyen
(74) Attorney, Agent, or Firm—Rosenberg, Klein & Lee

(57) ABSTRACT

The present invention provides a multi-resolution printing device, which includes a base-frequency clock generator and a control unit. The base-frequency clock generator is to generate only one base-frequency clock. The control unit includes a logic processor, a first frequency divider, a second frequency divider, and an external selector. Divisors of the first and second dividers are determined by resolution of the base-frequency clock and that of the desired printing clocks. While remainders of the base-frequency clock resolution divided by the desired printing clock resolutions are not zero, divisors of first and second frequency dividers are set to be the quotient and the quotient plus one; otherwise, divisors of first and second frequency dividers are all set to be the same quotient. The resolution of desired printing clock is obtained by executing the above procedure excursively.

1 Claim, 4 Drawing Sheets

MULTI-RESOLUTION PRINTING DEVICE

BACKGROUND OF THE INVENTION

1. Field of the Invention

The present invention relates to a multi-resolution printing device, and more particularly, to a printing device only processing one base-frequency clock to allow documents with different resolutions be printed out with their original sizes.

2. Description of Prior Arts

Along with the increasing development of small office home office (SOHO), in order to spend less time on operating different office equipments for different requirements, more and more SOHOs and small enterprises choose to adopt multi-function printers (MFPs), almost integrating every office machine function such as copying, faxing, scanning, and printing together. By this way, a small office company is able to run smoothly even with only one MFP equipped, and thus, to save some time waste.

Generally, when printing, the required resolution is 600 dpi of the imperial system. When faxing, the required resolution is only about 203 dpi of the metric system. Therefore, the MFP needs two clocks of different frequencies to provide different resolutions applicable to imperial or metric system.

As shown in FIG. 1 of a control circuit block diagram, the control circuit for providing different resolutions includes a first base-frequency clock generator 1a, a second base-frequency clock generator 1a', a first frequency divider 2a, a second frequency divider 2a', and an external selector 3a.

The first base-frequency clock generator 1a can generate a base-frequency clock for a resolution of M times of 600 dpi. The second base-frequency clock generator 1a' can generates a base-frequency clock for a resolution of N times of 203 dpi. The first frequency divider 2a, being a frequency divider with a divisor of M, is connected to the first base-frequency clock generator 1a, hence obtaining an output printing clock for 600 dpi resolution. The second frequency divider 2a', being a frequency divider with another divisor of N, is connected to the second base-frequency clock generator 1a', hence obtaining an output printing clock for 203 dpi resolution. The external selector 3a is connected to the first frequency divider 2a and the second frequency divider 2a', and is controlled by the system to selectively output the printing clock for 600 dpi or 203 dpi resolution to a printing engine 4a. In other words, when printing, the external selector 3a selects the printing clock for 600 dpi resolution of the first frequency divider 2a; when faxing, the external selector 3a selects the printing clock for 203 dpi resolution of the second frequency divider 2a.

However, there are usually not just two printing clocks required for a MFP. When the number of printing clocks increases, it is necessary to increase the number of components like base-frequency clock generators and frequency dividers accordingly. Because the base-frequency clock generators are expensive, the total cost of manufacturing one MFP relatively raises.

SUMMARY OF THE INVENTION

The primary object of the present invention is to provide a multi-resolution printing device, which only processes one base-frequency clock to allow documents of different resolutions required to be printed out with their original sizes. Sizes of the printing dot are variable in this invention, accordingly changing corresponding resolutions to allow documents of different resolutions to be printed with their original sizes.

Another object of the present invention is to provide a multi-resolution printing device, with the simplified circuit to save the hardware cost.

To achieve the above objects, the present invention provides a multi-resolution printing device, which includes a base-frequency clock generator and a control unit. The base-frequency clock generator is used to generate only one base-frequency clock. The control unit is connected to the base-frequency clock generator, and is used to process the base-frequency clock to output several printing clocks with different resolutions to a printing engine.

The various objects and advantages of the present invention will be more readily understood from the following detailed description when read in conjunction with the appended drawing, in which:

DETAILED DESCRIPTION OF THE PREFERRED EMBODIMENTS

Figure 1:
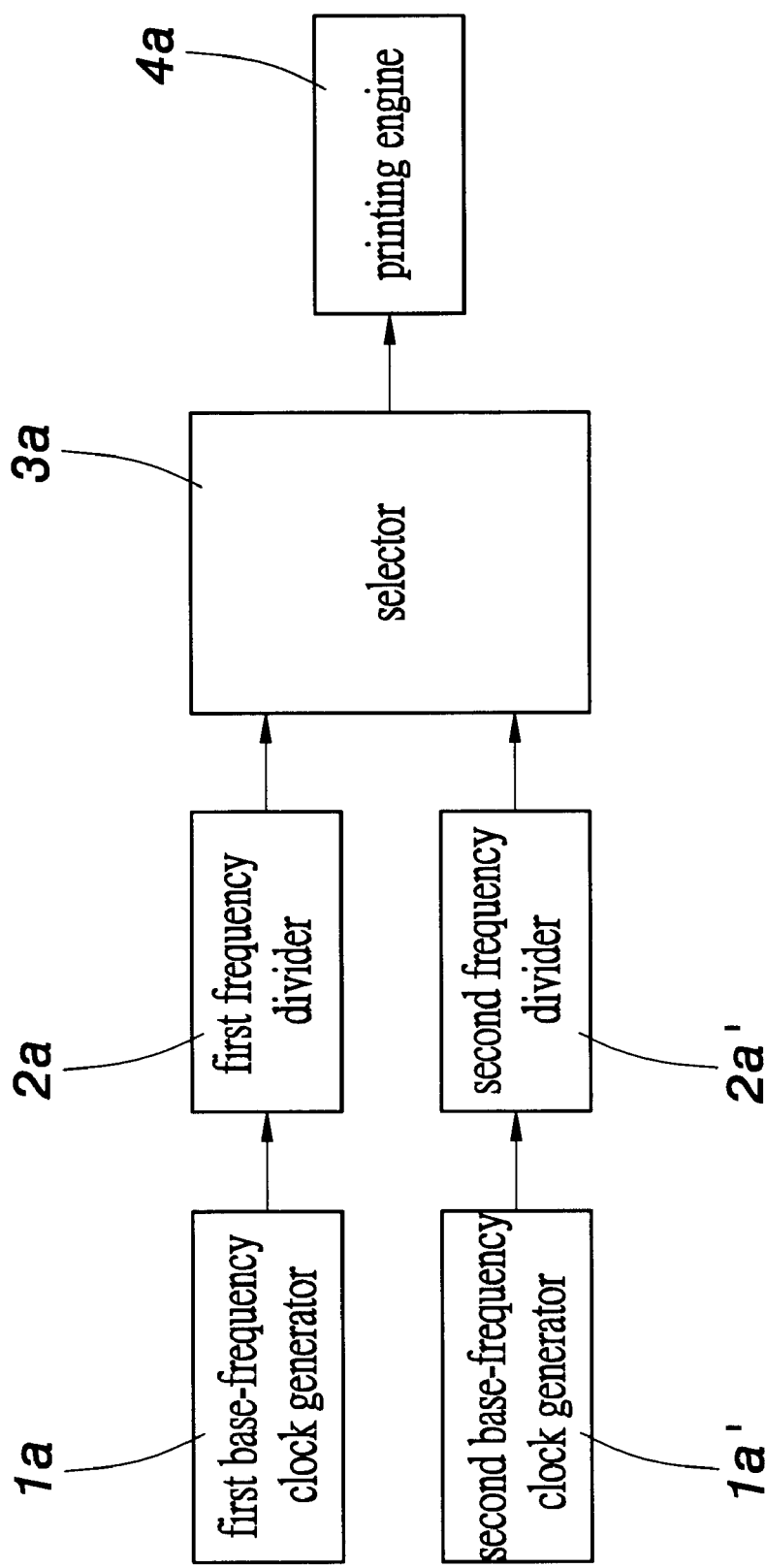
FIG. 1 is a block diagram of a prior art control circuit for printing data of different resolutions.
Figure 2:
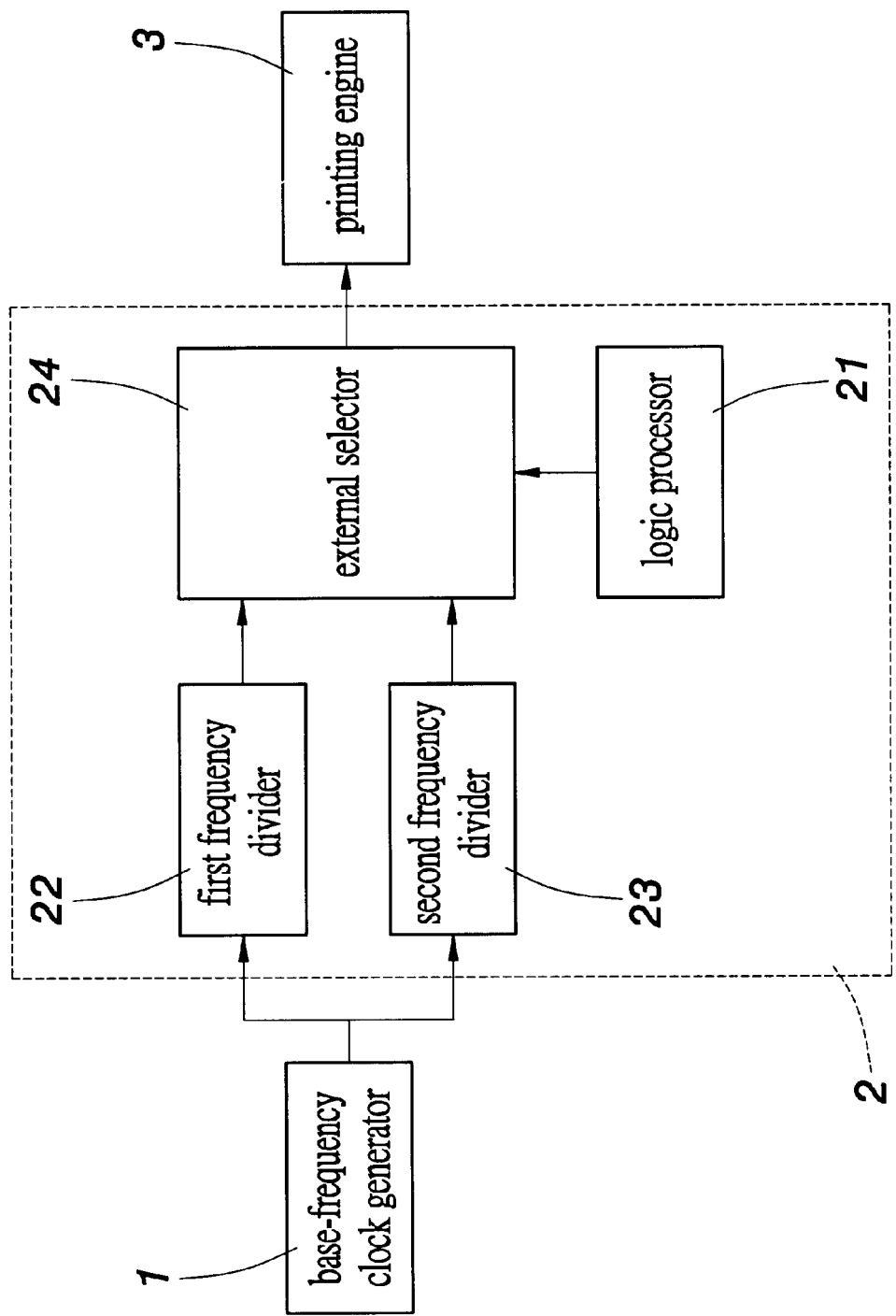
FIG. 2 is a block diagram of a control circuit for printing data of different resolutions in the present invention.

Please refer to FIG. 2. A multi-resolution printing device of the present invention includes a base-frequency clock generator 1 and a control unit 2. The base-frequency clock generator 1 generates one base-frequency clock. The control unit 2 processes the base-frequency clock and then outputs several printing clocks for different resolutions to a printing engine 3. The control unit 2 includes a logic processor 21, a first frequency divider 22, a second frequency divider 23, and an external selector 24.

The logic processor 21 is consisted of some logic circuit components, and is controlled by the system. The first and second frequency dividers 22 and 23 are connected to the base-frequency clock generator 1, and divide the base-frequency clock, hence obtaining two identical or different printing clocks. The external selector 24 is connected to the first and second frequency dividers 22 and 23 and the logic processor 21, and is further controlled by the logic processor 21 to selectively output the printing clock from the first or second divider 22 or 23 to the printing engine 3, thereby obtaining a weighted average of the desired printing clock, which is determined by the system.

Figure 3:
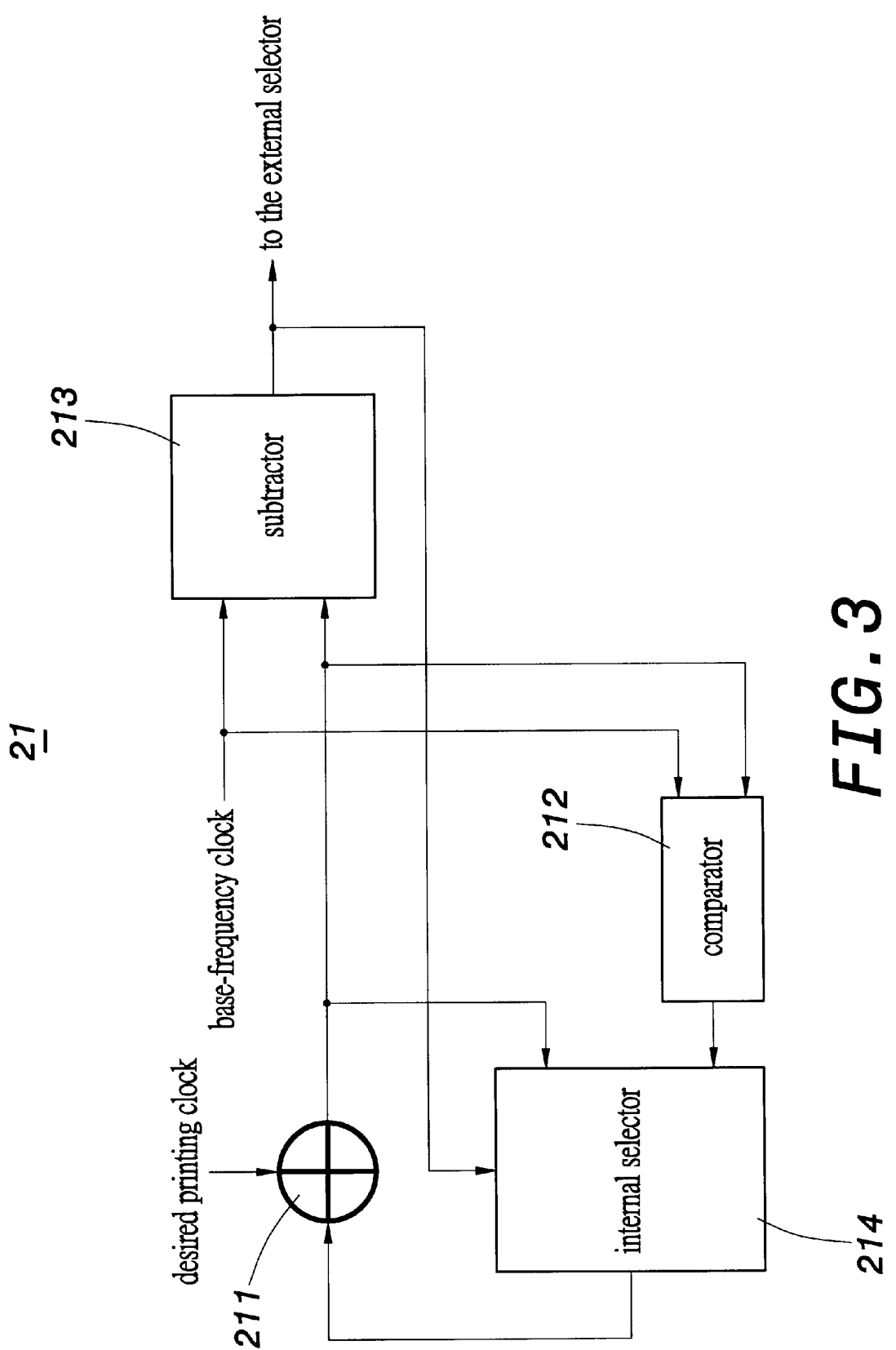
FIG. 3 is a circuit block diagram of a logic processor according to the present invention.

FIG. 3 is a circuit block diagram of the logic processor 21 according to the present invention. In this embodiment, the logic processor 21 further includes an adder 211, a subtractor 212, a comparator 213, and an internal selector 214.

The desired printing clock can be added with an outputted clock from the internal selector 214 by the adder 211 to obtain an added clock, which is simultaneously sent to the comparator 213 and the subtractor 212 and then sent back to the internal selector 214. The subtractor 212 subtracts the added clock from the base-frequency clock, and the result is sent to the external selector 24. The comparator 213 compares the base-frequency clock with the added clock. If the base-frequency clock is larger than the added clock, a control signal of "0" is outputted to the external and internal selectors 24 and 214. At this time, the external selector 24 will send the printing clock from the second frequency divider 23 to the printing engine 3, and the internal selector 214 will send the base-frequency clock to the adder 211. Contrarily, a control signal of "1" is outputted to the external and internal selectors 24 and 214 if the base-frequency clock is less than the added clock. Under this situation, the external selector 24 sends the printing clock from the first frequency divider 22 to the printing engine 3, and the internal selector 214 sends the subtraction result of the subtractor 212 to the adder 211. The output of the adder 211 is then sent to the comparator 213 for the sake of comparison with the base-frequency clock. The internal operations of the logic processor 21 are described above to control the external selector 24.

Figure 4:
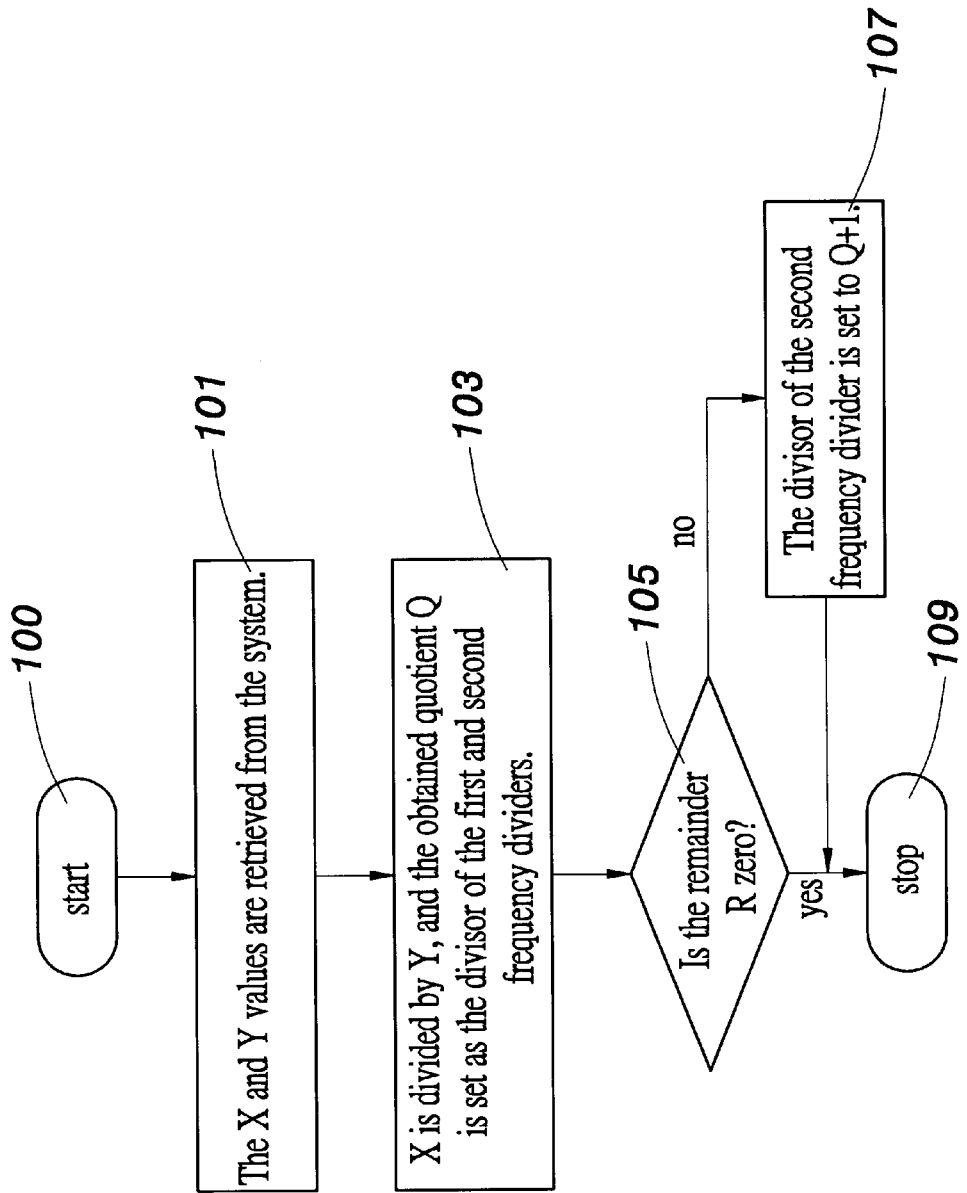
FIG. 4 is a flowchart of determining the divisors of a first and second frequency divider of the present invention.

Assume the base-frequency clock generator 1 can generate a base-frequency clock of the resolution of 2400 dpi. If one wants to fax documents at this point, the desired printing clock of the resolution is set to be 203 dpi. As shown in FIG. 4, the determination of the divisors of the first and second frequency dividers 22 and 23 are described below (assuming the base-frequency clock is X, and the desired printing clock is Y).

S101: The values of X and Y are retrieved from the system;

S103: X is divided by Y;

S105: Determine whether the remainder R after X is divided by Y is zero or not; if not, the divisor of the first frequency divider 21 is set to be the quotient (Q) from the result of dividing X by Y, the second frequency divider 23 is set to be Q+1(S107), and the whole procedures are stopped (S109); if the remainder R is zero, divisors of these two frequency dividers are both set to be Q, and the whole procedure is directly stopped.

When the base-frequency clock is for the resolution of 2400 dpi and the resolution of desired printing clock is 203 dpi, by the above steps, it is obvious to have a quotient (Q) of 11 and a remainder (R) of 167. Because R is not zero, the system will set the first frequency divider 22 as a divider with a divisor of 11 to obtain a printing clock of 218 dpi resolution. The system will also set the second divider 23 as a divider with a divisor 12(=11+1) to obtain a printing clock of 200 dpi resolution. These two printing clocks of 218 dpi and 200 dpi resolutions are close to the desired printing clock of 203 dpi.

Next, the logic processor 21 will control the external selector 24. At first, the system will automatically reset the output value of the adder 211 to zero. Because the base-frequency clock of 2400 dpi resolution is larger than this output value of 0, a control signal of "0" is outputted to the external and internal selectors 24 and 214. The external selector 24 will send the printing clock of 200 dpi resolution from the second frequency divider 23 to the printing engine 3, and the internal selector 214 will send the control signal of "0" to the adder 211. After addition, a resolution of 203 dpi is obtained and sent to the comparator 213 for comparison with the base-frequency clock of 2400 dpi resolution. Because the resolution of added clock is still smaller than that of the base-frequency clock, another control signal of "0" is continually outputted to the external and internal selectors 24 and 214 until outcome resolution of the adder 211 is larger than the resolution, equal to 2400 dpi, of the base-frequency clock. Meanwhile, the external selector 24 will continually send the printing clock of 200 dpi resolution to the printing engine 3, and the internal selector 214 will continually send the printing clock of 203 dpi resolution to the adder 211 for recursive addition.

When the resolution outcome of the adder 211 is 2436 dpi, which is larger than the resolution of base-frequency clock, the comparator 213 outputs a control signal of "1" to the external and internal selectors 24 and 214. The external selector 24 switches to sent a printing clock of 218 dpi resolution from the first frequency divider 22 to the printing engine 3, and the internal selector 214 sends the output value of the subtractor 212, which is equal to 36 (=2436−2400) dpi in this case, to the adder 211. At this moment, the resolution output of the adder 211 is 239 (=203+36) dpi, which is smaller than the base-frequency clock of 2400 dpi resolution again. A control signal of "0" is again outputted to the external and internal selectors 24 and 214 to selectively send the printing clock of 218 dpi resolution to the printing engine 3. Until the resolution output of the adder 211 is equal to 2472(=203+239*11) dpi, larger than 2400 dpi, the external selector 24 switches 218 dpi resolution of the first frequency divider 22 to the printing engine 3. The above procedure is performed recursively. As this result, the output resolution sequence to the printing engine 3 is continually with 203 dpi for many times and followed by one-time 218 dpi resolution. After the 218 dpi resolution, 203 dpi resolution appears again for a specific amount of times.

Besides, if one selects the printing function, resolution of desired printing clock is set to be 600 dpi. According to FIG. 4, the quotient (Q) is 4 and remainder (R) is 0. The system will thus set the first and second dividers 22 and 23 as dividers with a divisor 4, hence outputting a printing clock of 600 dpi resolution (the same as the desired printing clock). No matter how the logic processor 21 controls the external selector 24, a printing clock of 600 dpi is sent to the printing engine 3. Therefore, internal processing procedures of the logic processor 21 will not be further described.

To sum up, only one base-frequency clock generator 1 is required in the present invention for different printing clocks of 203 dpi and 600 dpi. Even the number of required printing clocks increases, it is only necessary to add extra adders and change the internal circuit of the logic processor 21 without any extra base-frequency clock generator required. Therefore, the design of circuit can be greatly simplified, and the hardware cost can be effectively saved.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A multi-resolution printing device for a Multi-function Printers (MFP), comprising:

a base-frequency clock generator for generating a base-frequency clock; and a control unit connected to said base-frequency clock generator for processing said base-frequency clock and then outputting a plurality of printing clocks for different resolutions to a printing engine, said control unit including:

a logic processor including an adder, a subtractor, a comparator, and an internal selector;

a first frequency divider connected to said base-frequency clock generator for dividing said base-frequency clock so as to generate a first printing clock;

a second frequency divider connected to said base-frequency clock generator for dividing said base-frequency clock so as to generate a second printing clock; and an external selector connected to said first frequency divider, second frequency divider and said logic processor, said external selector being controlled by said logic processor for selectively outputting said first printing clock or said second printing clock to said printing engine.

* * * * *